United States Patent
Feng et al.

(10) Patent No.: US 10,082,701 B2
(45) Date of Patent: Sep. 25, 2018

(54) LIQUID CRYSTAL DISPLAY PANEL AND MANUFACTURING METHOD THEREFOR, AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Yuanming Feng, Beijing (CN); Ni Jiang, Beijing (CN); Junrui Zhang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

(*) Notice: Subject to any disclaimer, the term of this patent is extended or adjusted under 35 U.S.C. 154(b) by 96 days.

(21) Appl. No.: 15/324,929

(22) PCT Filed: Aug. 21, 2015

(86) PCT No.: PCT/CN2015/087765
§ 371 (c)(1),
(2) Date: Jan. 9, 2017

(87) PCT Pub. No.: WO2016/115898
PCT Pub. Date: Jul. 28, 2016

(65) Prior Publication Data
US 2017/0205647 A1 Jul. 20, 2017

(30) Foreign Application Priority Data
Jan. 20, 2015 (CN) .......................... 2015 1 0028087

(51) Int. Cl.
*G02F 1/1339* (2006.01)
*G02F 1/1337* (2006.01)
(Continued)

(52) U.S. Cl.
CPC .......... *G02F 1/1337* (2013.01); *G02F 1/1339* (2013.01); *G02F 1/13394* (2013.01);
(Continued)

(58) Field of Classification Search
CPC ................... G02F 1/13394; G02F 2001/13396
See application file for complete search history.

(56) References Cited

U.S. PATENT DOCUMENTS

| 2014/0063431 A1* | 3/2014 | Shih | ...... | G02F 1/1339 349/153 |
| 2016/0147104 A1* | 5/2016 | Chou | ...... | G02F 1/1339 349/153 |

FOREIGN PATENT DOCUMENTS

| CN | 101344696 A | 1/2009 |
| CN | 102402071 A | 4/2012 |

(Continued)

OTHER PUBLICATIONS

International Search Report and Written Opinion dated Oct. 22, 2015; PCT/CN2015/087765.

(Continued)

*Primary Examiner* — Phu Vu
(74) *Attorney, Agent, or Firm* — Ladas & Parry LLP (57) ABSTRACT

A liquid crystal display panel and a manufacturing method therefor, and a display device are provided. The display panel includes an opposing substrate, an array substrate, and a sealant. A limiting portion surrounding a display region is disposed in a non-display region of the opposing substrate. A non-display region of the array substrate includes a loosely-arranged wire region surrounding a display region and a densely-arranged wire region surrounding the loosely-arranged wire region. The layer height of the array substrate in the densely-arranged wire region is greater than that of the array substrate in the loosely-arranged wire region. The projection of the sealant on the opposing substrate is located outside the limiting region and the projection of the sealant on the array substrate is located in the densely-arranged wire region.

20 Claims, 5 Drawing Sheets

(51) Int. Cl.
 *G02F 1/1335* (2006.01)
 *G02F 1/1362* (2006.01)
 *G02F 1/1333* (2006.01)
(52) U.S. Cl.
 CPC .. *G02F 1/133345* (2013.01); *G02F 1/133512* (2013.01); *G02F 1/133514* (2013.01); *G02F 1/136286* (2013.01); *G02F 2001/133354* (2013.01); *G02F 2001/133388* (2013.01); *G02F 2001/136295* (2013.01)

(56) References Cited

FOREIGN PATENT DOCUMENTS

| CN | 103353692 A | 10/2013 |
|---|---|---|
| CN | 103576390 A | 2/2014 |
| CN | 104570461 A | 4/2015 |
| CN | 204496140 U | 7/2015 |
| JP | 2010-170038 A | 8/2010 |

OTHER PUBLICATIONS

The First Chinese Office Action dated Mar. 2, 2017; Appln. No. 201510038087.8.

\* cited by examiner

LIQUID CRYSTAL DISPLAY PANEL AND MANUFACTURING METHOD THEREFOR, AND DISPLAY DEVICE

TECHNICAL FIELD

At least one embodiment of the present invention relates to a liquid crystal display panel and a manufacturing method thereof, and a display device.

BACKGROUND

Nowadays, a narrow frame design has become an important development trend in a field of display. The narrow frame design is attractive in design and relatively low in cost and takes an important effect on large-size splicing design, and thus, many manufacturers of display device all pursue the narrow frame design.

SUMMARY

At least one embodiment of the present invention provides a liquid crystal display panel and a preparation method thereof and a display device so as to solve the problem of a bad product caused by low position accuracy of an alignment film of the liquid crystal display panel and adhesion between a sealant and the alignment film extending to a non-display region.

At least one embodiment of the present invention provides a liquid crystal display panel which includes an opposed substrate and an array substrate which are oppositely arranged, and a sealant arranged between the opposed substrate and the array substrate; a limiting portion surrounding a display region is arranged in a non-display region of the opposed substrate, and an alignment film on the opposed substrate is in a range surrounded by the limiting portion; a non-display region of the array substrate includes a sparsely-arranged wire region surrounding a display region of the array substrate, and a densely-arranged wire region surrounding the sparsely-arranged wire region, a layer height of the array substrate in the densely-arranged wire region is greater than that of the array substrate in the sparsely-arranged wire region, and an alignment film on the array substrate is in a range surrounded by the densely-arranged wire region; and a projection of the sealant on the opposed substrate is positioned outside the limiting portion, and a projection of the sealant on the array substrate is positioned in the densely-arranged wire region.

At least one embodiment of the present invention further provides a liquid crystal display panel which includes an opposed substrate and an array substrate which are oppositely arranged, and a sealant arranged between the opposed substrate and the array substrate; a first limiting portion surrounding a display region is arranged in a non-display region of the opposed substrate, and a first alignment film on the opposed substrate is in a range surrounded by the first limiting portion; a second limiting portion surrounding a display region is arranged in a non-display region of the array substrate, and a second alignment film on the array substrate is in a range surrounded by the second limiting portion; the sealant has an inner side wall; along a direction in parallel with a plane where the first alignment film is positioned, one end of the first limiting portion is positioned between the first alignment film and the inner side wall of the sealant; and along a direction in parallel with a plane where the second alignment film is positioned, one end of the second limiting portion is positioned between the second alignment film and the inner side wall of the sealant.

At least one embodiment of the present invention further provides a display device which includes the liquid crystal display panel provided by any one embodiment as above.

At least one embodiment of the present invention further provides a preparation method of a display panel. The method includes: arranging a limiting portion surrounding a display region in a non-display region of an opposed substrate, and enabling an alignment film on the opposed substrate to be in a range surrounded by the limiting portion; forming a sparsely-arranged wire region surrounding a display region of an array substrate and a densely-arranged wire region surrounding the sparsely-arranged wire region in a non-display region of the array substrate, enabling an alignment film on the array substrate to be in a range surrounded by the densely-arranged wire region, and enabling a layer height of the array substrate in the densely-arranged wire region to be greater than that of the array substrate in the sparsely-arranged wire region; and adhering the opposed substrate to the array substrate by a sealant, enabling a projection of the sealant on the color filter substrate to be positioned outside the limiting portion, and enabling a projection of the sealant on the array substrate to be positioned in the densely-arranged wire region.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure, but not intended to define the disclosure.

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, the technical terms or scientific terms here should be of general meaning as understood by those ordinarily skilled in the art. In the present disclosure, words such as "first", "second" and the like do not denote any order, quantity, or importance, but rather are used for distinguishing different components. Similarly, words such as "one", "a/an" or "the" or the like do not denote quantitative limitation, but rather indicate there is at least one. Words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "connected" or "connecting" and the like are not limited to physical or mechanical connections, but may include electrical connection, either direct or indirect. Words such as "up", "down", "left", "right" and the like are only used for expressing relative positional relationship, when the absolute position is a described object is changed, the relative positional relationship may also be correspondingly changed.

In research, an inventor of the application notes that a liquid crystal display panel with a narrow frame is limited in space in a non-display region and relatively low in position accuracy in the process of preparing an alignment film, and thus, the alignment film often exceeds an edge of a display region of the liquid crystal display panel and extends to the non-display region, so that a sealant is respectively adhered to the alignment films on a color filter substrate and an array substrate; and a low adhesive force between the sealant and the alignment film causes poor reliability (for example, water vapor can penetrate or light is leaked) of the liquid crystal display panel so as to cause poor product quality of the liquid crystal display panel.

In order to obtain the alignment films with accurate positions so as to enable the alignment films not to influence an effect of adhering the color filter substrate and the array substrate of the display panel by utilizing a sealant, according to at least one embodiment of the present invention, by arranging a limiting portion on an opposed substrate (e.g., the color filter substrate) and arranging a densely-arranged wire region and a sparsely-arranged wire region which have a segment difference on the array substrate, the positions of the alignment films are limited, so that the positions of the alignment films are accurate, and the sealant cannot be adhered to the alignment films, thereby avoiding poor product quality of the liquid crystal display panel.

A liquid crystal display panel provided by at least one embodiment of the present invention includes an opposed substrate and an array substrate which are arranged oppositely, and a sealant arranged between the opposed substrate and the array substrate; a limiting portion surrounding a display region is arranged in a non-display region of the opposed substrate, and an alignment film on the opposed substrate is in a range surrounded by the limiting portion; a non-display region of the array substrate includes a sparsely-arranged wire region surrounding a display region of the array substrate, and a densely-arranged wire region surrounding the sparsely-arranged wire region, a layer height of the array substrate in the densely-arranged wire region is greater than that of the array substrate in the sparsely-arranged wire region, and an alignment film on the array substrate is in a range surrounded by the densely-arranged wire region; and a projection of the sealant on the opposed substrate is positioned outside the limiting portion, and a projection of the sealant on the array substrate is positioned in the densely-arranged wire region.

In the embodiment of the present invention, the alignment film on the opposed substrate is blocked by the limiting portion, and the alignment film on the array substrate is blocked by the densely-arranged wire region, and thus, the positions of the alignment films on the opposed substrate and the array substrate can be respectively and accurately controlled according to positions of the limiting portion and the densely-arranged wire regions.

For example, the opposed substrate can be a color filter substrate or a transparent substrate. For example, in the case that the opposed substrate is the color filter substrate, a color filter layer or the color filter layer and a black matrix can be arranged on the opposed substrate.

It should be noted that in the embodiment of the present invention, the limiting portion on the opposed substrate can be a groove-shaped limiting portion, and also can be a protrusion-shaped limiting portion. The groove-shaped or protrusion-shaped limiting portion is simple in structure and easy to achieve.

In order to illustrate the liquid crystal display panel provided by the embodiments of the present invention in more details, the liquid crystal display panel is illustrated in the following in connection with the drawings FIG. 1 to FIG. 7 by taking the case that the opposed substrate is the color filter substrate as an example.

Embodiment I

Figure 1:
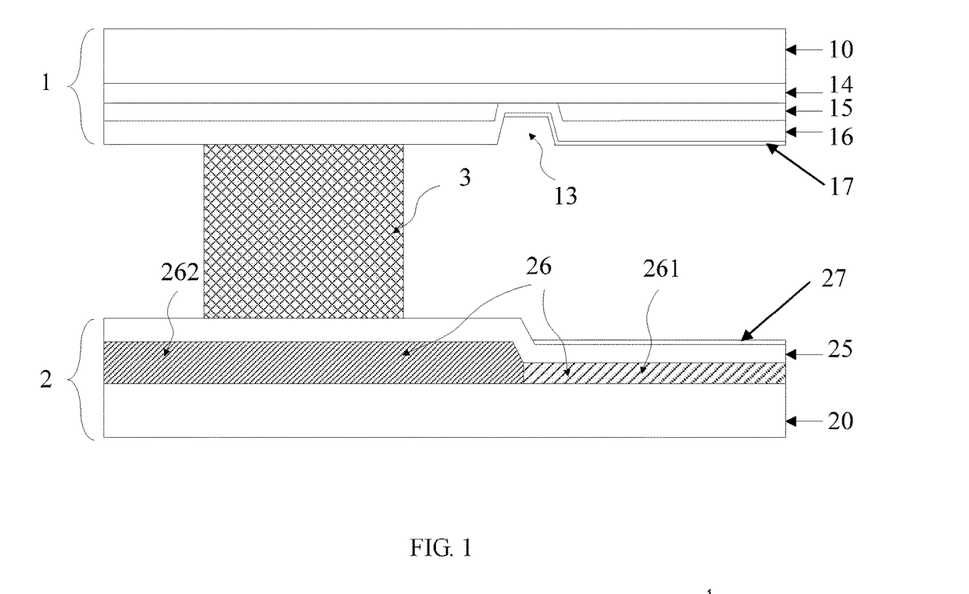
FIG. 1 is a sectional schematic diagram of a non-display region of a first liquid crystal display panel provided by an embodiment of the present invention.

With reference to FIG. 1, FIG. 1 illustrates a sectional schematic diagram of a non-display region of a first liquid crystal display panel. The first liquid crystal display panel includes a color filter substrate 1 and an array substrate 2 which are arranged oppositely, and a sealant 3 arranged between the color filter substrate 1 and the array substrate 2.

Figure 2:
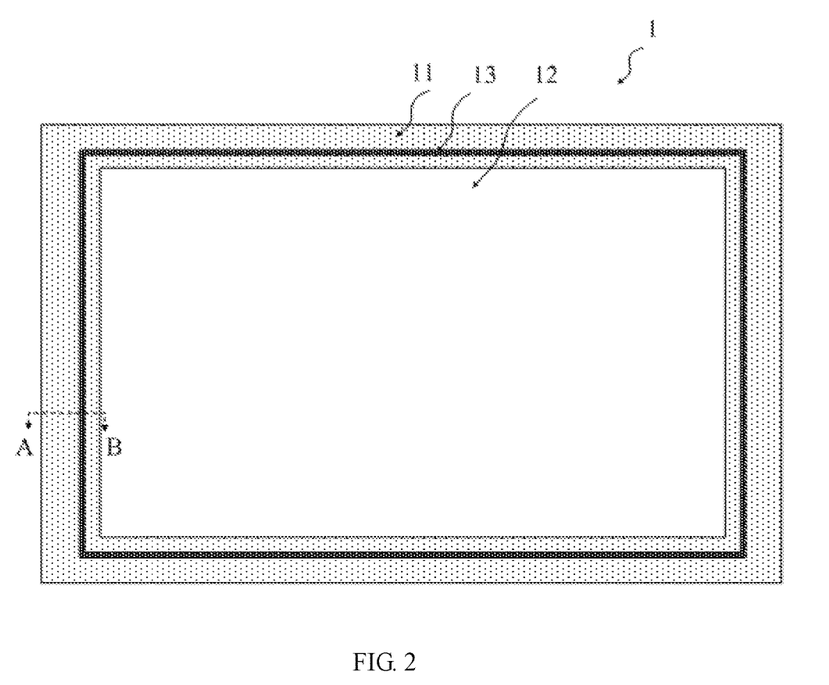
FIG. 2 is a top-view schematic diagram of a color filter substrate provided by an embodiment of the present invention.
Figure 3A:
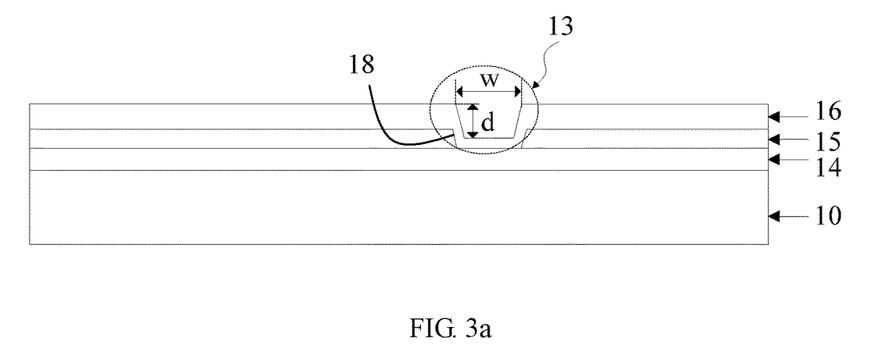
FIG. 3a is a sectional schematic diagram of a color filter substrate in the liquid crystal display panel illustrated in FIG. 1 at an AB position in FIG. 2.
Figure 3B:
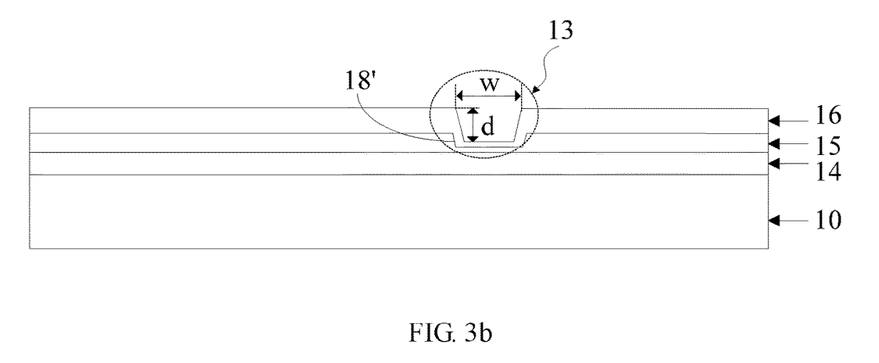
FIG. 3b is a sectional schematic diagram of a color filter substrate in a liquid crystal display panel provided by an embodiment of the present invention at the AB position in FIG. 2.

In connection with FIG. 2, a limiting portion 13 surrounding a display region 12 is arranged in a non-display region 11 of the color filter substrate 1, and an alignment film 17 on the color filter substrate 1 is in a range surrounded by the limiting portion 13. FIG. 3a illustrates a sectional schematic diagram of the non-display region 11 of the color filter substrate 1, and the sectional schematic diagram is a sectional schematic diagram of the color filter substrate 1 in FIG. 1 at an AB position in FIG. 2. As illustrated in FIG. 3a, for example, the color filter substrate 1 can include a first base substrate 10, a lamination of a black matrix 14 and a color filter layer 15 which are formed on the first base substrate 10, and a first insulating layer 16 above the lamination; and in the lamination of the black matrix 14 and the color filter layer 15, the color filter layer 15 can be positioned above the black matrix 14, or the black matrix 14 can be positioned above the color filter layer 15. For example, a hollow-out portion or a concave portion surrounding the display region 12 can be formed on the color filter layer 15 and the black matrix 14, and the groove-shaped limiting portion 13 can be formed by covering the hollow-out portion or the concave portion with the first insulating layer 16. For example, as illustrated in FIG. 3a, the color filter layer 15 is positioned above the black matrix 14, and the hollow-out portion 18 surrounding the display region 12 is formed on the color filter layer 15. For example, as illustrated in FIG. 3b, the color filter layer 15 is positioned above the black matrix 14, and the concave portion 18' surrounding the display region 12 is formed on the color filter layer 15.

Certainly, the black matrix 14 can also be positioned above the color filter layer 15, and the hollow-out portion or the concave portion surrounding the display region 12 is formed on the color filter layer 15 or the black matrix 14; or, the color filter layer 15 is positioned above the black matrix 14, and the hollow-out portion or the concave portion surrounding the display region 12 is formed on the black matrix 14 or the hollow-out portions or the concave portions surrounding the display region 12 are formed on both the black matrix 14 and the color filter layer 15. Therefore, the embodiments of the present invention do not limit a lamination relationship of the color filter layer 15 and the black matrix 14 and the position of the hollow-out portion or the concave portion, as long as the groove-shaped limiting portion 13 can be formed at a position where the first insulating layer 16 covers the hollow-out portion or the concave portion; and based on achievement of a shielding aim, the structure illustrated in FIG. 1 is preferred.

A mode of forming the hollow-out portion or the concave portion on the color filter layer 15 and/or the black matrix 14 and enabling the first insulating layer 16 to cover the hollow-out portion or the concave portion to form the groove-shaped limiting portion does not need to add a preparation process and is easy to achieve. The groove-shaped limiting portion 13 can block alignment liquid from flowing towards the non-display region 11 in the process of preparing the alignment film 17 on the color filter substrate 1, so that the alignment liquid is limited in a specified region, for example, in the range surrounded by the groove-shaped limiting portion 13. Certainly, a small volume of alignment liquid is possibly stored in the groove-shaped limiting portion 13, but it does not influence limitation of the groove-shaped limiting portion 13 to liquidity of the alignment liquid, and thus, finally, the alignment film formed by the alignment liquid has an accurate position, i.e., the edge of the alignment film is controllable and accurate.

Generally, a planarization layer or other insulating layers can be arranged on the color filter substrate 1, the first insulating layer 16 can be the planarization layer, and can also be one of other film layers with the insulating property, as long as the groove-shaped limiting portion 13 can be formed after the first insulating layer covers the lamination of the color filter layer 15 and the black matrix 14, which is not repeated herein.

Or, for example, the color filter substrate in the non-display region can include the first insulating layer, and the groove-shaped limiting portion can be arranged in the first insulating layer. In such case, the first insulating layer can be patterned in the process of forming the first insulating process so as to form the groove-shaped limiting portion 13 in the first insulating layer.

From the above, the first insulating layer 16 can be provided with a concave structure at a position corresponding to the groove-shaped limiting portion 13, and the color filter layer 15 and/or the black matrix layer 14 can have a flat upper surface or can be provided with the hollow-out portion or the concave portion at a position corresponding to the groove-shaped concave portion 13.

Figure 4:
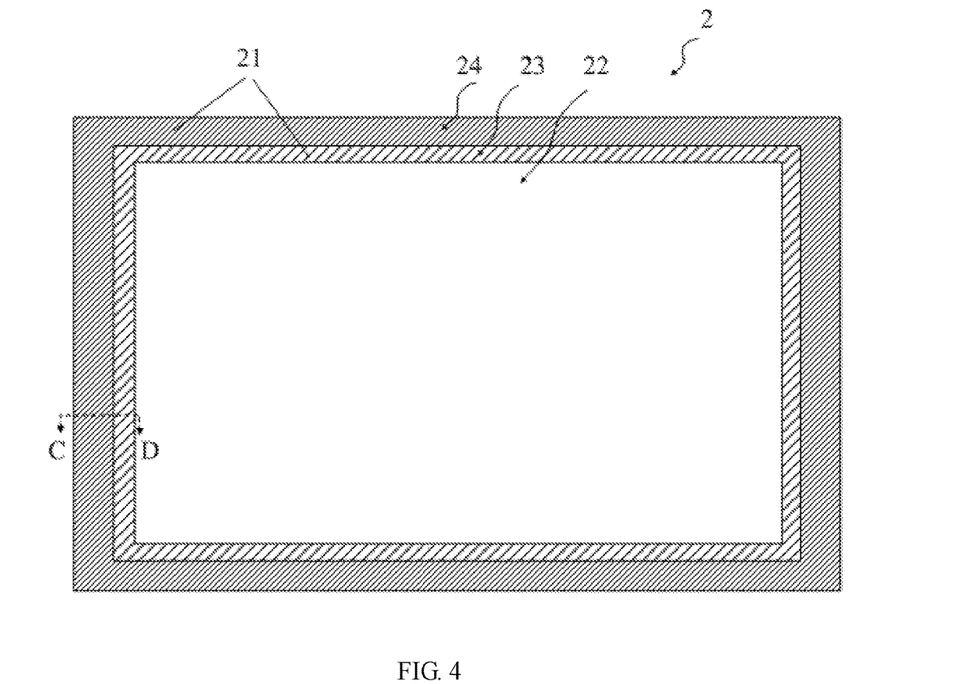
FIG. 4 is a top-view schematic diagram of an array substrate provided by an embodiment of the present invention.
Figure 6:
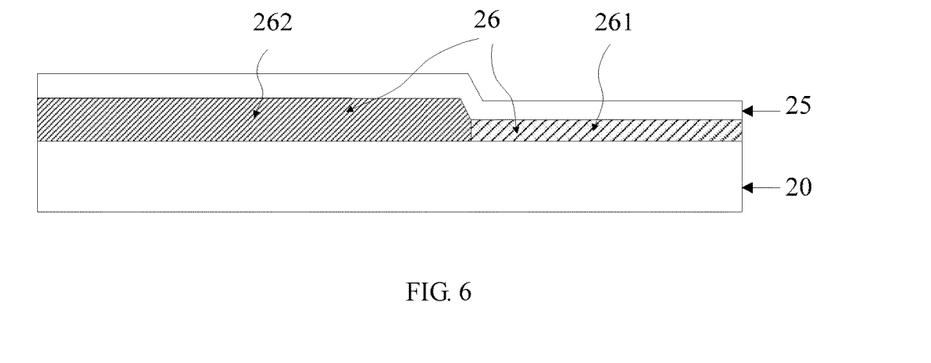
FIG. 6 is a sectional schematic diagram of a non-display region of an array substrate provided by an embodiment of the present invention.

In connection with FIG. 4, a non-display region 21 of the array substrate 2 includes a sparsely-arranged wire region 23 surrounding a display region 22 of the array substrate 2, and a densely-arranged wire region 24 outside the sparsely-arranged wire region 23, a layer height of the array substrate 2 in the densely-arranged wire region 24 is greater than that of the array substrate 2 in the sparsely-arranged wire region 23, and an alignment film 27 on the array substrate 2 is in a range surrounded by the densely-arranged wire region 24. FIG. 6 illustrates a sectional schematic diagram of the non-display region 21 of the array substrate 2, and the sectional schematic diagram is a sectional schematic diagram of the array substrate 2 in FIG. 1 at a CD position in FIG. 4. As illustrated in FIG. 6, the array substrate 2 includes a second base substrate 20 and a wire layer 26 and a second insulating layer 25 which are arranged on the second base substrate 20. For example, the wire layer 26 can include a wire layer formed by wires only positioned on one layer, or may include wire layers formed by wires positioned on different layers. For example, the wire layer 26 can be a source and drain electrode metal layer including data lines; for another example, the wire layer 26 can be a gate electrode metal layer including gate lines; for yet another example, the wire layer 26 can be a multilayer structure of the source and drain electrode metal layer including the data lines and the gate electrode metal layer including the gate lines; and correspondingly, the second insulating layer 25 can be a passivation layer, can also be a planarization layer, or is one of other layers with the insulating property. The wire layer 26 includes sparsely-arranged wires 261 and densely-arranged wires 262, the sparsely-arranged wires 261 are positioned in the sparsely-arranged wire region 23, and the densely-arranged wires 262 are positioned in the densely-arranged wire region 24. The densely-arranged wires 262 are arranged densely or arranged in a multilayer manner, so that a layer height of the densely-arranged wires 262 is greater than that of the sparsely-arranged wires 261, and thus, after the second insulating layer 25 is formed, the densely-arranged wire region 24 and the sparsely-arranged wire region 23 can have a certain segment difference, i.e., the layer height of the densely-arranged wire region 24 is greater than that of the sparsely-arranged wire region 23. In the case that the layer height of the densely-arranged wire region 24 is greater than that of the sparsely-arranged wire region 23, the densely-arranged wire region 24 can block alignment liquid from flowing towards the non-display region 21 in the process of preparing the alignment film on the array substrate 2, so that the alignment liquid is limited in a specified region and finally, forms the alignment film. Finally, the alignment film formed by the alignment liquid has an accurate position, i.e., the edge of the alignment film is controllable and accurate.

Certainly, in order to reasonably set a wire arrangement spacing of the wires in the densely-arranged wire region 24 and the sparsely-arranged wire region 23 and enable the alignment liquid to have good liquidity when the second insulating layer is coated, for example, a spacing range between adjacent wires in the densely-arranged wire region 24 can be 1 to 3 micrometers, and a spacing between adjacent wires in the sparsely-arranged wire region 23 can be greater than or equal to 5 micrometers.

As illustrated in FIG. 1, a projection of the sealant 3 on the color filter substrate 1 is positioned outside the groove-shaped limiting portion 13, and a projection of the sealant 3 on the array substrate 2 is positioned in the densely-arranged wire region 24.

In the embodiment of the present invention, by arranging the groove-shaped limiting portion 13 on the color filter substrate 1 and arranging the densely-arranged wire region 24 and the sparsely-arranged wire region 23 which have the segment difference on the array substrate 2, the position of the alignment film is limited, so that the position of the alignment film is accurate and the sealant 3 cannot be adhered to the alignment film, thereby avoiding poor product quality of the liquid crystal display panel.

For example, the groove-shaped limiting portion 13 can correspond to a position at a junction of the densely-arranged wire region 24 and the sparsely-arranged wire region 23. In the embodiment of the present invention, the alignment film 17 defined by the groove-shaped limiting portion 13 on the color filter substrate 1 and the alignment film 27 defined by the densely-arranged wire region 24 on the array substrate 2 are little different in edge position, which makes it convenient to arrange the sealant 3.

For example, as illustrated in FIG. 3a and FIG. 3b, a depth d of the groove-shaped limiting portion 13 can be 1 to 3 micrometers. For example, as illustrated in FIG. 3a and FIG. 3b, a minimum section width w of the groove-shaped limiting portion 13 can be 100 to 300 micrometers. In the embodiment of the present invention, the depth d and the minimum section width w of the groove-shaped limiting portion 13 are controlled in a relatively reasonable range, can ensure that the alignment liquid flowing into the groove-shaped limiting portion 13 cannot flow again or overflow, and is beneficial for controlling position accuracy of the finally formed alignment films.

For example, the limiting portion 13 on the color filter substrate 1 is adjacent to the alignment film 17 on the color filter substrate 1, and the densely-arranged wire region 24 on the array substrate 2 is adjacent to the alignment film 27 on the array substrate 2.

For example, the first insulating layer 16 on the color filter substrate 1 can be in contact with the alignment film 17 on the color filter substrate 1. For example, the second insulating layer 25 on the array substrate 2 can be in contact with the alignment film 27 on the array substrate 2.

The embodiment of the present invention has beneficial effects as follows: by arranging the groove-shaped limiting portion 13 on the color filter substrate 1 and arranging the densely-arranged wire region 24 and the sparsely-arranged wire region 23 which have the segment difference on the array substrate 2, the positions of the alignment films are limited, so that the positions of the alignment films are accurate, the sealant 3 cannot be adhered to the alignment films, and reliability of the liquid crystal display panel is improved, thereby avoiding poor product quality of the liquid crystal display panel.

Embodiment II

Figure 7:
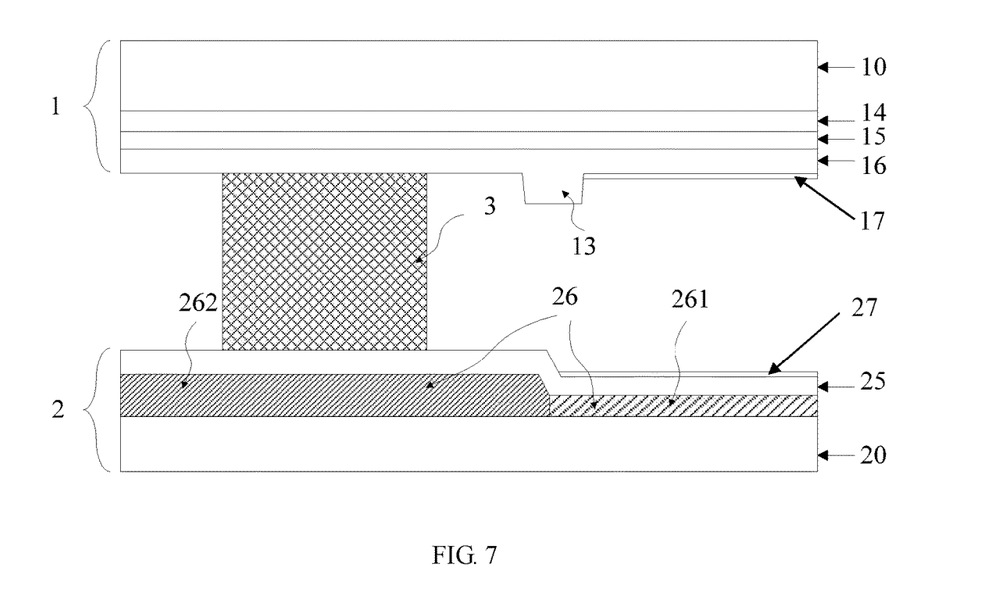
FIG. 7 is a sectional schematic diagram of a non-display region of a second liquid crystal display panel provided by an embodiment of the present invention.

With reference to FIG. 7, FIG. 7 illustrates a sectional schematic diagram of a non-display region of a second liquid crystal display panel. The liquid crystal display panel includes a color filter substrate 1 and an array substrate 2 which are arranged oppositely, and a sealant 3 arranged between the color filter substrate 1 and the array substrate 2.

Figure 5:
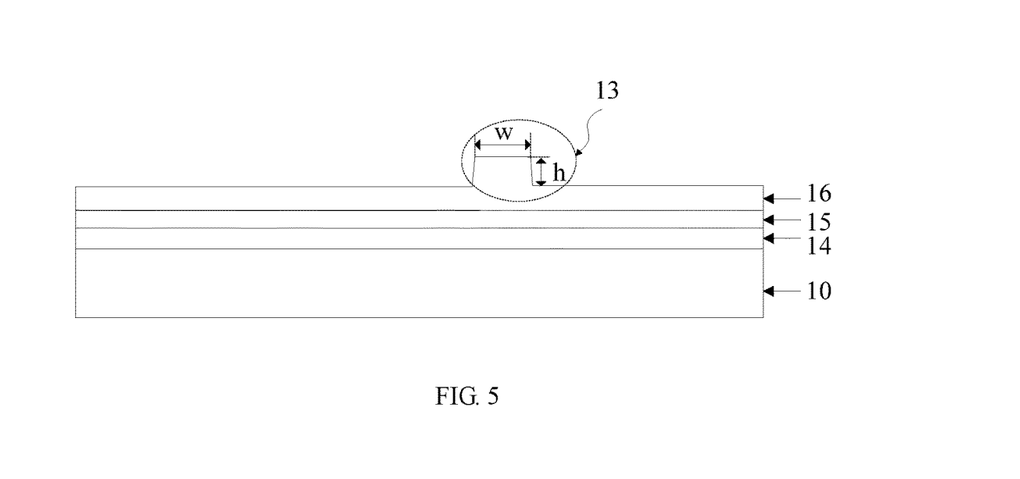
FIG. 5 is a sectional schematic diagram of a color filter substrate in a liquid crystal display panel illustrated in FIG. 7 at a CD position in FIG. 4.

In connection with FIG. 2, a limiting portion 13 surrounding a display region 12 is arranged in a non-display region 11 of the color filter substrate 1, and an alignment film 17 on the color filter substrate 1 is in a range surrounded by the limiting portion 13. FIG. 5 illustrates a sectional schematic diagram of the non-display region 11 of the color filter substrate 1, and the sectional schematic diagram is a sectional schematic diagram of the color filter substrate 1 in FIG. 7 at the AB position in FIG. 2. As illustrated in FIG. 5, the color filter substrate 1 includes a first base substrate 10 and a black matrix 14, a color filter layer 15 and a first insulating layer 16 which are sequentially arranged on the first base substrate 10, and the protrusion-shaped limiting portion 13 can be integrally formed with the first insulating layer 16 or separately formed on the first insulating layer 16. For example, the protrusion-shaped limiting portion 13 is formed in the process of preparing the first insulating layer 16, and the protrusion-shaped limiting portion 13 is made of a same material with the first insulating layer 16; and for another example, after preparation of the first insulating layer 16 is completed, the protrusion-shaped limiting portion 13 is formed on the first insulating layer 16.

In the embodiment, the protrusion-shaped limiting portion 13 is easy to achieve and has a good limiting effect. The protrusion-shaped limiting portion 13 can block alignment liquid from flowing towards the non-display region 11 in the process of preparing the alignment film on the color filter substrate 1, so that the alignment liquid is limited in a specified region, for example, in the range surrounded by the protrusion-shaped limiting portion 13. Finally, the alignment film formed by the alignment liquid has an accurate position, i.e., the edge of the alignment film is controllable and accurate.

Generally, a planarization layer or other insulating layers can be arranged on the color filter substrate 1, and as long as the protrusion-shaped limiting portion 13 can be arranged, the first insulating layer 16 can be the planarization layer, and can also be one of other film layers with the insulating property, which is not repeated herein.

In connection with FIG. 4, a non-display region 21 of the array substrate 2 includes a sparsely-arranged wire region 23 surrounding a display region 22 of the array substrate 2, and a densely-arranged wire region 24 outside the sparsely-arranged wire region 23, a layer height of the array substrate 2 in the densely-arranged wire region 24 is greater than that of the array substrate 2 in the sparsely-arranged wire region 23, and an alignment film 27 on the array substrate 2 is in a range surrounded by the densely-arranged wire region 24. FIG. 6 illustrates a sectional schematic diagram of the non-display region 21 of the array substrate 2, and the sectional schematic diagram is a sectional schematic diagram of the array substrate 2 in FIG. 7 at the CD position in FIG. 4. As illustrated in FIG. 6, the array substrate 2 can include a second base substrate 20 and a wire layer 26 and a second insulating layer 25 which are sequentially formed on the second base substrate 20; and the wire layer 26 can include sparsely-arranged wires 261 and densely-arranged wires 262, the sparsely-arranged wires 261 are positioned in the sparsely-arranged wire region 23, and the densely-arranged wires 262 are positioned in the densely-arranged wire region 24. The densely-arranged wires 262 are arranged densely or arranged in a multilayer manner, so that a layer height of the densely-arranged wires 262 is greater than that of the sparsely-arranged wires 261, and thus, after the second insulating layer 25 is formed, the densely-arranged wire region 24 and the sparsely-arranged wire region 23 can have a certain segment difference, i.e., the layer height of the densely-arranged wire region 24 is greater than that of the sparsely-arranged wire region 23. In the case that the layer height of the densely-arranged wire region 24 is greater than that of the sparsely-arranged wire region 23, the densely-arranged wire region 24 can block alignment liquid from flowing towards the non-display region 21 in the process of preparing the alignment film on the array substrate 2, so that the alignment liquid is limited in a specified region and finally, forms the alignment film. Finally, the alignment film formed by the alignment liquid has an accurate position, i.e., the edge of the alignment film is controllable and accurate.

Certainly, in order to reasonably set a wire arrangement spacing of the wires in the densely-arranged wire region 24 and the sparsely-arranged wire region 23 and enable the alignment liquid to have good liquidity when the second insulating layer is coated, for example, a spacing range between adjacent wires in the densely-arranged wire region 24 can be 1 to 3 micrometers, and a spacing between adjacent wires in the sparsely-arranged wire region 23 can be greater than or equal to 5 micrometers.

As illustrated in FIG. 7, a projection of the sealant 3 on the color filter substrate 1 is positioned outside the protrusion-shaped limiting portion 13, and a projection of the sealant 3 on the array substrate 2 is positioned in the densely-arranged wire region 24.

In the embodiment of the present invention, by arranging the protrusion-shaped limiting portion 13 on the color filter substrate 1 and arranging the densely-arranged wire region 24 and the sparsely-arranged wire region 23 which have the segment difference on the array substrate 2, the positions of the alignment films are limited, so that the positions of the alignment films are accurate and the sealant 3 cannot be adhered to the alignment films, thereby avoiding poor product quality of the liquid crystal display panel.

For example, the protrusion-shaped limiting portion 13 can correspond to a position at a junction of the densely-arranged wire region 24 and the sparsely-arranged wire region 23. In the embodiment of the present invention, the alignment film defined by the protrusion-shaped limiting portion 13 on the color filter substrate 1 and the alignment film defined by the densely-arranged wire region 24 on the array substrate 2 are little different in edge position, which makes it convenient to arrange the sealant 3.

For example, as illustrated in FIG. 5, a height h of the protrusion-shaped limiting portion 13 can be 1 to 3 micrometers. For example, a minimum section width w of the protrusion-shaped limiting portion 13 can be 100 to 300 micrometers. In the embodiment of the present invention, the height h and the minimum section width w of the protrusion-shaped limiting portion 13 are controlled in a relatively reasonable range, can ensure that the alignment liquid flowing to the protrusion-shaped limiting portion 13 cannot overflow, and is beneficial for controlling position accuracy of the finally formed alignment films.

The embodiment of the present invention has beneficial effects as follows: by arranging the protrusion-shaped limiting portion 13 on the color filter substrate 1 and arranging the densely-arranged wire region 24 and the sparsely-arranged wire region 23 which have the segment difference on the array substrate 2, the positions of the alignment films are limited, so that the positions of the alignment films are accurate, and the sealant 3 cannot be adhered to the alignment films, thereby avoiding poor product quality of the liquid crystal display panel.

It should be noted that the liquid crystal display panel provided by the embodiment of the present invention should further include components for enabling the liquid crystal display panel to display, e.g., a liquid crystal, a control circuit, a pixel unit and the like, which is not repeated herein.

Embodiment III

Figure 8:
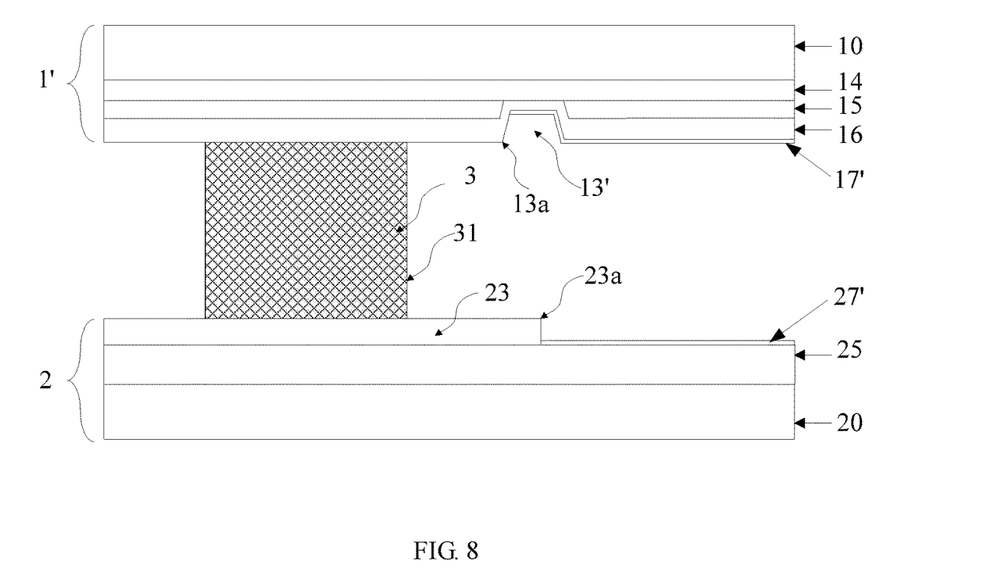
FIG. 8 is a sectional schematic diagram of a non-display region of a third liquid crystal display panel provided by an embodiment of the present invention.

The embodiment provides a liquid crystal display panel. As illustrated in FIG. 8, the liquid crystal display panel includes an opposed substrate 1' and an array substrate 2 which are arranged oppositely, and a sealant 3 arranged between the opposed substrate 1' and the array substrate 2; a first limiting portion 13' surrounding a display region is arranged in a non-display region of the opposed substrate 1', and a first alignment film 17' on the opposed substrate 1' is in a range surrounded by the first limiting portion 13'; a second limiting portion 23 surrounding a display region is arranged in a non-display region of the array substrate 2, and a second alignment film 27' on the array substrate 2 is in a range surrounded by the second limiting portion 23; the sealant 3 has an inner side wall 31; along a direction in parallel with a plane where the first alignment film 17' is positioned, one end 13a of the first limiting portion 13 is positioned between the first alignment film 17' and the inner side wall 31 of the sealant 3; and along a direction in parallel with a plane where the second alignment film 27' is positioned, one end 23a of the second limiting portion 23 is positioned between the second alignment film 27' and the inner side wall 31 of the sealant 3.

In the embodiment, by arranging the first limiting portion 13' on the opposed substrate and arranging the second limiting portion 23 on the array substrate 2, positions of the alignment films are limited, so that the positions of the alignment films are accurate, and the sealant cannot be adhered to the alignment films, thereby avoiding poor product quality of the liquid crystal display panel.

In the embodiment, the first limiting portion 13' is adjacent to the first alignment film 17' on the opposed substrate 1', and the second limiting portion 23 is adjacent to the second alignment film 27' on the array substrate 2.

For example, a first insulating layer 16 on the opposed substrate 1' can be in contact with the first alignment film 17' on the opposed substrate 1'; and for example, a second insulating layer 25 on the array substrate 2 can be in contact with the second alignment film 27' on the array substrate 2.

For example, the position of the first limiting portion 13' can correspond to that of the second limiting portion 23. Such arrangement can enable the first alignment film 17' defined by the first limiting portion 13' on the opposed substrate 1' and the second alignment film 27' defined by the second limiting portion 23 on the array substrate 2 to be little different in edge position, and makes it convenient to arrange the sealant 3.

For example, each of the first limiting portion 13' and the second limiting portion 23 can be of a groove shape or a protrusion shape. The groove-shaped or protrusion-shaped limiting portions are simple in structure and easy to achieve.

The groove-shaped first limiting portion 13' and the protrusion-shaped limiting portion 13' can respectively refer to related description of the limiting portion 13 in Embodiment I and Embodiment II, and are not repeated herein.

For example, the groove-shaped second limiting portion 23 can be arranged in the second insulating layer 25 on the array substrate 2. For example, the groove-shaped second limiting portion 23 in the second insulating layer 25 can be formed in the process of patterning the second insulating layer 25.

For example, the protrusion-shaped second limiting portion 23 can be arranged on the second insulating layer 25 on the array substrate 2. For example, the protrusion-shaped second limiting portion 23 can be integrally formed with the second insulating layer 25, or the protrusion-shaped second limiting portion 23 can be separately formed on the second insulating layer 25.

For example, in the case that the second limiting portion is of a protrusion shape, a projection of the sealant 3 on the array substrate 2 can be positioned outside the second limiting portion 23; or, as illustrated in FIG. 8, the projection of the sealant 3 on the array substrate 2 can be positioned in a region where the second limiting portion 23 is positioned;

or, a projection of an outer side wall (not illustrated in FIG. 8) of the sealant 3 on the array substrate is positioned outside the second limiting portion 23 and a projection of the inner side wall 31 of the sealant 3 on the array substrate is positioned in the region where the second limiting portion 23 is positioned.

Embodiment IV

The embodiment of the present invention provides a display device. The display device includes the liquid crystal display panel provided by any one embodiment as above.

The embodiment of the present invention has beneficial effects as follows: by arranging the limiting portion on the color filter substrate and arranging the densely-arranged wire region and the sparsely-arranged wire region which have the segment difference on the array substrate, the positions of the alignment films are limited, so that the positions of the alignment films are accurate, and the sealant cannot be adhered to the alignment films, thereby avoiding poor product quality of the liquid crystal display panel.

Embodiment V

Figure 9:
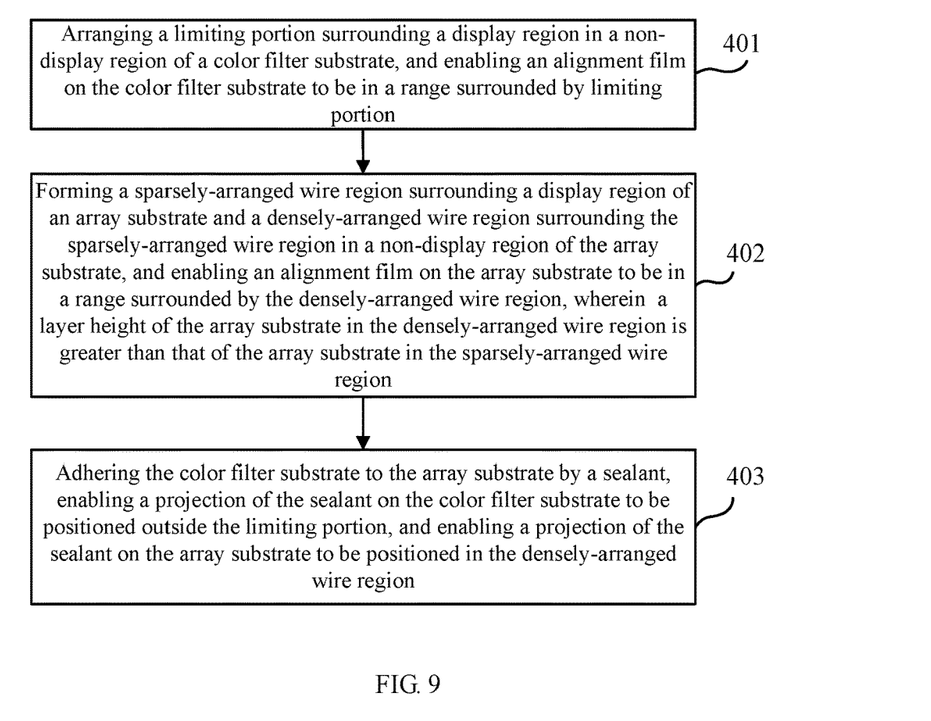
FIG. 9 is a flow chart of a preparation method of a liquid crystal display panel, which is provided by an embodiment of the present invention.

With reference to FIG. 9, the embodiment of the present invention provides a preparation method of a display panel. The method includes steps S401 to S403 as follows, and the steps will be illustrated in details in the following.

S401: arranging a limiting portion surrounding a display region in a non-display region of a color filter substrate, and enabling an alignment film on the color filter substrate to be in a range surrounded by the limiting portion.

For example, the limiting portion can be of a groove shape or a protrusion shape.

For example, a specific preparation method of the groove-shaped limiting portion can include: forming a lamination of a black matrix and a color filter layer on the non-display region of the color filter substrate, enabling the color filter layer and/or the black matrix to have a hollow-out portion or a concave portion surrounding the display region of the color filter substrate by a patterning process, forming a first insulating layer on the lamination of the color filter layer and the black matrix, and forming the groove-shaped limiting portion at the position where the first insulating layer covers the hollow-out portion or the concave portion.

For example, a preparation method of the protrusion-shaped limiting portion can include: forming a lamination of a black matrix and a color filter layer and a first insulating layer on the lamination in the non-display region of the color filter substrate, and integrally forming the protrusion-shaped limiting portion and the first insulating layer or separately forming the protrusion-shaped limiting portion on the first insulating layer.

It should be noted that preparation of the groove-shaped or protrusion-shaped limiting portion is not limited to the methods above, the methods above are only used as preferable embodiments for illustrating the present invention, and the embodiments of the present invention are not limited hereto.

S402: forming a sparsely-arranged wire region surrounding a display region of an array substrate and a densely-arranged wire region surrounding the sparsely-arranged wire region in a non-display region of the array substrate, and enabling an alignment film on the array substrate to be in a range surrounded by the densely-arranged wire region; in the step, a layer height of the array substrate in the densely-arranged wire region is greater than that of the array substrate in the sparsely-arranged wire region.

In the embodiment, preparation processes in the step S401 and the step S402 are not the same process, and thus, the preparation processes can be separately carried out and have no absolute sequential relationship. It should be noted that in order to enable the prepared alignment films on the color filter substrate and the array substrate to have a good position corresponding relationship, for example, the limiting portion on the color filter substrate can correspond to the position at the junction of the densely-arranged wire region and the sparsely-arranged wire region on the array substrate. For example, the preparation method provided by the embodiment can include: laying out a plurality of sparsely-arranged wires surrounding the display region and a plurality of densely-arranged wires outside each sparsely-arranged wire in the non-display region of the array substrate, and forming a second insulating layer above the plurality of sparsely-arranged wires and the plurality of densely-arranged wires so as to obtain the sparsely-arranged wire region corresponding to the plurality of sparsely-arranged wires and the densely-arranged wire region corresponding to the plurality of densely-arranged wires.

S403: adhering the color filter substrate to the array substrate by a sealant, enabling a projection of the sealant on the color filter substrate to be positioned outside the limiting portion, and enabling a projection of the sealant on the array substrate to be positioned in the densely-arranged wire region.

The embodiment of the present invention has beneficial effects as follows: by arranging the limiting portion on the color filter substrate and arranging the densely-arranged wire region and the sparsely-arranged wire region which have the segment difference on the array substrate, the positions of the alignment films are limited, so that the positions of the alignment films are accurate, and the sealant cannot be adhered to the alignment films, thereby avoiding poor product quality of the liquid crystal display panel.

The foregoing embodiments merely are exemplary embodiments of the disclosure, and not intended to define the scope of the disclosure, and the scope of the disclosure is determined by the appended claims.

The present application claims priority of the Chinese Patent Application No. 201510028087.8 filed on Jan. 20, 2015, the disclosure of which are incorporated herein by its reference in its entirety as part of the present application.

The invention claimed is:

1. A liquid crystal display panel, comprising an opposed substrate and an array substrate which are oppositely arranged, and a sealant arranged between the opposed substrate and the array substrate, wherein
   a limiting portion surrounding a display region is arranged in a non-display region of the opposed substrate, and an alignment film on the opposed substrate is in a range surrounded by the limiting portion;
   a non-display region of the array substrate includes a sparsely-arranged wire region surrounding a display region of the array substrate, and a densely-arranged wire region surrounding the sparsely-arranged wire region, a layer height of the array substrate in the densely-arranged wire region is greater than that of the array substrate in the sparsely-arranged wire region, and an alignment film on the array substrate is in a range surrounded by the densely-arranged wire region; and
   a projection of the sealant on the opposed substrate is positioned outside the limiting portion, and a projection of the sealant on the array substrate is positioned in the densely-arranged wire region.

2. The liquid crystal display panel according to claim 1, wherein the limiting portion corresponds to a position at a junction of the densely-arranged wire region and the sparsely-arranged wire region.

3. The liquid crystal display panel according to claim 1, wherein the limiting portion is of a groove shape or a protrusion shape.

4. The liquid crystal display panel according to claim 3, wherein the opposed substrate in the non-display region includes a first insulating layer, and a black matrix and/or a color filter layer below the first insulating layer, the color filter layer and/or the black matrix is provided with a hollow-out portion or a concave portion surrounding the display region of the opposed substrate, and the groove-shaped limiting portion is formed by covering the hollow-out portion or the concave portion with the first insulating layer; or
the opposed substrate in the non-display region includes a first insulating layer, and the groove-shaped limiting portion is arranged in the first insulating layer.

5. The liquid crystal display panel according to claim 3, wherein a depth of the groove-shaped limiting portion is 1 to 3 micrometers.

6. The liquid crystal display panel according to claim 3, wherein a minimum section width of the groove-shaped limiting portion is 100 to 300 micrometers.

7. The liquid crystal display panel according to claim 3, wherein the opposed substrate in the non-display region includes a first insulating layer, and the protrusion-shaped limiting portion is formed on the first insulating layer.

8. The liquid crystal display panel according to claim 7, wherein the protrusion-shaped limiting portion is made of a same material with the first insulating layer.

9. The liquid crystal display panel according to claim 7, wherein a height of the protrusion-shaped limiting portion is 1 to 3 micrometers.

10. The liquid crystal display panel according to claim 7, wherein a minimum section width of the protrusion-shaped limiting portion is 100 to 300 micrometers.

11. The liquid crystal display panel according to claim 1, wherein the array substrate in the non-display region includes a plurality of wires and a second insulating layer which are sequentially formed, a spacing range between adjacent wires in the densely-arranged wire region is 1 to 3 micrometers, and a spacing between adjacent wires in the sparsely-arranged wire region is greater than or equal to 5 micrometers.

12. A liquid crystal display panel, comprising an opposed substrate and an array substrate which are oppositely arranged, and a sealant arranged between the opposed substrate and the array substrate, wherein
a first limiting portion surrounding a display region is arranged in a non-display region of the opposed substrate, and a first alignment film on the opposed substrate is in a range surrounded by the first limiting portion;
a second limiting portion surrounding a display region is arranged in a non-display region of the array substrate, and a second alignment film on the array substrate is in a range surrounded by the second limiting portion;
the sealant has an inner side wall; along a direction in parallel with a plane where the first alignment film is positioned, one end of the first limiting portion is positioned between the first alignment film and the inner side wall of the sealant; and along a direction in parallel with a plane where the second alignment film is positioned, one end of the second limiting portion is positioned between the second alignment film and the inner side wall of the sealant.

13. The liquid crystal display panel according to claim 12, wherein a position of the first limiting portion corresponds to that of the second limiting portion.

14. The liquid crystal display panel according to claim 12, wherein each of the first limiting portion and the second limiting portion is of a groove shape or a protrusion shape.

15. A display device, comprising the liquid crystal display panel according to claim 1.

16. A preparation method of a display panel, comprising:
arranging a limiting portion surrounding a display region in a non-display region of an opposed substrate, and enabling an alignment film on the opposed substrate to be in a range surrounded by the limiting portion;
forming a sparsely-arranged wire region surrounding a display region of an array substrate and a densely-arranged wire region surrounding the sparsely-arranged wire region in a non-display region of the array substrate, and enabling an alignment film on the array substrate to be in a range surrounded by the densely-arranged wire region, wherein a layer height of the array substrate in the densely-arranged wire region is greater than that of the array substrate in the sparsely-arranged wire region; and
adhering the opposed substrate to the array substrate by a sealant, enabling a projection of the sealant on the opposed substrate to be positioned outside the limiting portion, and enabling a projection of the sealant on the array substrate to be positioned in the densely-arranged wire region.

17. The preparation method according to claim 16, wherein the limiting portion corresponds to a position at a junction of the densely-arranged wire region and the sparsely-arranged wire region.

18. The preparation method according to claim 16, wherein the limiting portion is of a groove shape or a protrusion shape.

19. The preparation method according to claim 18, wherein arranging the limiting portion surrounding the display region in the non-display region of the opposed substrate and enabling the alignment film on the opposed substrate to be in the range surrounded by the limiting portion includes:
forming a lamination of a black matrix and a color filter layer in the non-display region of the opposed substrate, enabling the color filter layer and/or the black matrix to have a hollow-out portion or a concave portion surrounding the display region of the opposed substrate by a patterning process, forming a first insulating layer on the lamination of the color filter layer and the black matrix, and enabling the first insulating layer to cover the position of the hollow-out portion to form the groove-shaped limiting portion; or,
forming a lamination of a black matrix and a color filter layer and a first insulating layer on the lamination in the non-display region of the opposed substrate, and integrally forming the protrusion-shaped limiting portion and the first insulating layer or separately forming the protrusion-shaped limiting portion on the first insulating layer.

20. The preparation method according to claim 16, wherein forming the sparsely-arranged wire region surrounding the display region of the array substrate and the densely-arranged wire region surrounding the sparsely-arranged wire region includes:

laying out a plurality of sparsely-arranged wires surrounding the display region and a plurality of densely-arranged wires outside each sparsely-arranged wire in the non-display region of the array substrate, and forming a second insulating layer above the plurality of sparsely-arranged wires and the plurality of densely-arranged wires so as to obtain the sparsely-arranged wire region corresponding to the plurality of sparsely-arranged wires and the densely-arranged wire region corresponding to the plurality of densely-arranged wires.

\* \* \* \* \*